United States Patent
Bono et al.

(10) Patent No.: US 10,915,497 B1
(45) Date of Patent: Feb. 9, 2021

(54) MULTI-TIER STORAGE SYSTEM WITH CONTROLLABLE RELOCATION OF FILES FROM FILE SYSTEM TIER TO CLOUD-BASED OBJECT STORAGE TIER

(71) Applicant: EMC IP Holding Company LLC, Hopkinton, MA (US)

(72) Inventors: Jean-Pierre Bono, Westboro, MA (US); Sudhir Srinivasan, Acton, MA (US); Walter Forrester, Berkeley Heights, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 367 days.

(21) Appl. No.: 15/665,391

(22) Filed: Jul. 31, 2017

(51) Int. Cl.
*G06F 16/00* (2019.01)
*G06F 16/11* (2019.01)
*G06F 16/182* (2019.01)
*G06F 16/17* (2019.01)

(52) U.S. Cl.
CPC .......... *G06F 16/119* (2019.01); *G06F 16/122* (2019.01); *G06F 16/1734* (2019.01); *G06F 16/183* (2019.01)

(58) Field of Classification Search
CPC .... G06F 16/119; G06F 16/122; G06F 16/183; G06F 16/1734; G06F 17/30067; G06F 3/0605; G06F 3/067; G06F 3/0631; G06F 3/0647
See application file for complete search history.

(56) References Cited

U.S. PATENT DOCUMENTS

| 8,825,652 | B1 | 9/2014 | Faibish et al. |
| 8,972,465 | B1 | 3/2015 | Faibish et al. |
| 9,223,800 | B1 | 12/2015 | Faibish et al. |
| 2010/0153634 | A1 | 6/2010 | Fellinger et al. |
| 2010/0332818 | A1* | 12/2010 | Prahlad .............. G06Q 30/0206 713/150 |

(Continued)

OTHER PUBLICATIONS

"EMC 2 Tiers Solution Prototype," http://veddiew.typepad.com/blog/2015/05/emc-two-tiers-storage-solution-prototype.html, Sep. 25, 2015, 2 pages.

(Continued)

*Primary Examiner* — Ashish Thomas
*Assistant Examiner* — Suman Rajaputra
(74) *Attorney, Agent, or Firm* — Ryan, Mason & Lewis, LLP

(57) ABSTRACT

An apparatus in one embodiment comprises a storage system having at least first and second storage tiers each comprising a plurality of storage devices. The first storage tier implements a file system having a user visible name space and a corresponding hidden data store. The second storage tier implements a cloud-based object store. The storage system is configured to controllably relocate files from the hidden data store of the file system of the first storage tier to the cloud-based object store of the second storage tier. In conjunction with the relocation of a given one of the files, the given file is replaced in the hidden data store with a corresponding stub providing user access via the user visible name space to an object comprising the given file in the cloud-based object store of the second storage tier. The controllable relocation is illustratively performed in accordance with one or more configured policies.

21 Claims, 5 Drawing Sheets

(56) References Cited

U.S. PATENT DOCUMENTS

| | | | | |
|---|---|---|---|---|
| 2012/0036161 A1* | 2/2012 | Lacapra | ............... | G06F 16/182 707/781 |
| 2012/0239713 A1* | 9/2012 | Velummylum | ......... | G06F 16/61 707/822 |
| 2013/0227194 A1 | 8/2013 | Kannan et al. | | |

OTHER PUBLICATIONS

EMC Corporation, "EMC Tiered Storage for SAP: a New Way to Optimize with Use Cases for EMC Symmetrix VMAX with FAST and Virtual LUN," White Paper, Applied Technology, May 2010, 14 pages.

EMC Corporation, "EMC 2-Tiers—POSIX Namespace for 2nd and 3rd Platform Storage Systems," Dec. 2015, 3 pages.

EMC Corporation, "EMC Elastic Cloud Storage—Software-Defined Object Storage—Cloud-Scale Capabilities and Economics," EMC Data Sheet, Oct. 2015, 4 pages.

EMC Corporation, "EMC ATMOS Cloud Storage—A Platform to Store, Archive, and Access Unstructured Data at Scale—Data, Application, Access Demands," EMC Data Sheet, Sep. 2014, 3 pages.

EMC Corporation, "Technical White Paper: Elastic Cloud Storage Software Architecture—Deploy a Modern Hyperscale Storage Platform on Commodity Infrastructure," EMC White Paper, Feb. 2015, 12 pages.

EMC Corporation, "EMC SCALEIO Operation Overview—Ensuring Non-Disruptive Operation and Upgrade," EMC White Paper, Mar. 2015, 10 pages.

U.S. Appl. No. 14/871,160 filed in the name of S. Faibish et al. filed Sep. 30, 2015 and entitled "Translation-Based Name Node Configuration for Object Access in a Multi-Tier Storage System."

U.S. Appl. No. 14/973,245 filed in the name of Sorin Faibish et al. filed Dec. 17, 2015 and entitled "Multi-Tier Storage System Having Front-End Storage Tier Implemented Utilizing Software-Defined Storage Functionality."

U.S. Appl. No. 15/185,236 filed in the name of Sorin Faibish et al. filed Jun. 17, 2016 and entitled "Storage System Comprising Cluster File System Storage Nodes and Software-Defined Storage Pool in Cloud Infrastructure."

U.S. Appl. No. 15/447,965 filed in the name of Sorin Faibish et al. filed Mar. 2, 2017 and entitled "Multi-Tier Storage System with Dynamic Power Management Utilizing Configurable Data Mover Modules."

\* cited by examiner

US 10,915,497 B1

MULTI-TIER STORAGE SYSTEM WITH CONTROLLABLE RELOCATION OF FILES FROM FILE SYSTEM TIER TO CLOUD-BASED OBJECT STORAGE TIER

FIELD

The field relates generally to information processing systems, and more particularly to storage in information processing systems.

BACKGROUND

Storage systems are often configured to include multiple storage tiers, with different ones of the tiers providing different levels of input-output (IO) performance or other characteristics. In such systems, data may be moved from one tier to another within a given storage system based on access frequency of the data or other factors. However, conventional storage tiering arrangements can be unduly inflexible when implemented in a storage system that comprises a parallel file system or other type of file system. For example, transfer of large files or other types of data objects between storage tiers of such a storage system can be inefficient and potentially wasteful of storage system resources under certain conditions.

SUMMARY

Illustrative embodiments provide multi-tier storage systems configured for controllable relocation of files from a hidden data store of a file system of a first storage tier to a cloud-based object store of a second storage tier.

For example, in some embodiments, compressed and deduplicated files are controllably relocated from the hidden data store of the file system of the first storage tier to the cloud-based object store of the second storage tier, and stored as respective objects in the cloud-based object store. In conjunction with this relocation of the compressed and deduplicated files, the compressed and deduplicated files are replaced in the hidden data store with respective stubs that can be utilized by a client device to access those files as respective objects in the cloud-based object store of the second storage tier.

Such embodiments can advantageously provide significantly improved efficiency in policy-driven automated transfer of large files between a parallel file system tier and a cloud-based object storage tier of a multi-tier storage system. Similar advantages can be provided in other types of multi-tier storage systems.

In one embodiment, an apparatus comprises a storage system having at least first and second storage tiers each comprising a plurality of storage devices. The first storage tier implements a file system having a user visible name space and a corresponding hidden data store. The second storage tier implements a cloud-based object store. The storage system is configured to controllably relocate files from the hidden data store of the file system of the first storage tier to the cloud-based object store of the second storage tier.

In conjunction with the relocation of a given one of the files, the given file is replaced in the hidden data store with a corresponding stub providing user access via the user visible name space to an object comprising the given file in the cloud-based object store of the second storage tier.

The controllable relocation of the files from the hidden data store of the file system of the first storage tier to the cloud-based object store of the second storage tier comprises relocation performed in accordance with one or more configured policies, such as policies configured in a policy engine of a cloud tiering appliance that controls the relocation of the files and generates the corresponding stubs.

The files that are controllably relocated from the hidden data store of the file system of the first storage tier to the cloud-based object store of the second storage tier illustratively comprise respective compressed and deduplicated files of the hidden data store of the file system that also have corresponding stubs in the user visible name space.

In some embodiments, write operations against files that have been controllably relocated from the hidden data store of the file system of the first storage tier to the cloud-based object store of the second storage tier are cached locally in the first storage tier and subsequently pushed to the cloud-based object store so as to enhance write performance.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
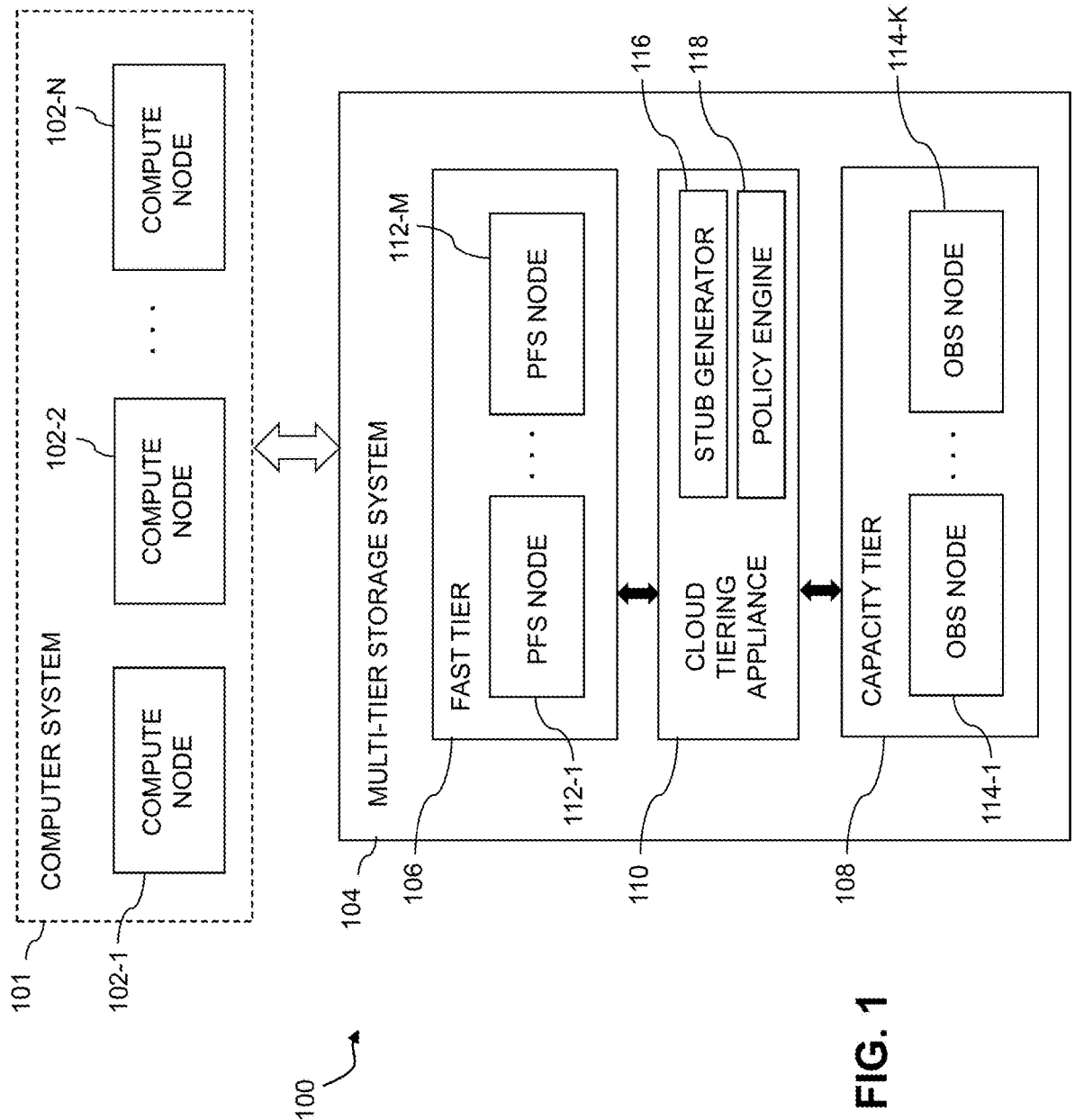
FIG. 1 is a block diagram of an information processing system configured with functionality for controllable relocation of files from a hidden data store of a file system of a first storage tier to a cloud-based object store of a second storage tier.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate with a multi-tier storage system 104 over one or more networks that are not explicitly shown in the figure.

The compute nodes 102 illustratively comprise respective processing devices of one or more processing platforms. For example, the compute nodes 102 can comprise respective virtual machines each having a processor and a memory. Numerous other configurations are possible. The compute nodes 102 in some embodiments may be part of a supercomputer or other type of high-performance computer system.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The multi-tier storage system 104 comprises a fast tier 106, a capacity tier 108 and a cloud tiering appliance 110. The fast tier 106 is an example of what is more generally referred to herein as a "front-end storage tier" or still more generally a "first storage tier" of the multi-tier storage system 104. The capacity tier 108 is an example of what is more generally referred to herein as a "back-end storage tier" or still more generally a "second storage tier" of the multi-tier storage system 104. Other types and arrangements of two or more storage tiers can be used in other embodiments. Each of the fast tier 106 and the capacity tier 108 is assumed to comprise a plurality of storage devices.

The multi-tier storage system 104 in the present embodiment illustratively implements a parallel file system (PFS) comprising PFS nodes 112-1 through 112-M associated with the fast tier 106. The PFS nodes 112 may comprise respective PFS servers of the fast tier 106. In other embodiments, an additional set of PFS servers or other type of PFS nodes may be associated with the capacity tier 108. Each such PFS server may be associated with one or more storage devices of its corresponding storage tier. The PFS nodes 112 may be viewed as examples of what are more generally referred to herein as "storage nodes."

The storage devices of the fast tier 106 in some implementations more particularly comprise non-volatile memory (NVM) devices. Examples of such storage devices include flash memory devices, 3D XPoint devices, non-volatile random access memory (NVRAM) devices, or other types of non-volatile memory devices including phase-change RAM (PC-RAM) and magnetic RAM (MRAM). Various combinations of multiple different types of non-volatile memory devices may also be used.

The capacity tier 108 in this embodiment illustratively comprises a plurality of object storage nodes ("OBS nodes") 114-1, . . . 114-K. The OBS nodes 114 of the capacity tier 108 collectively implement at least one object store in which stored data objects have respective unique object identifiers. The OBS nodes 114 may also be viewed as examples of what are more generally referred to herein as "storage nodes."

The storage devices of the capacity tier 108 in some implementations more particularly comprise hard disk drive (HDD) devices. Additional or alternative types of storage devices that may be implemented in the capacity tier 108 include solid state drive (SSD) devices as well as other types of disk-based or electronic memory.

The cloud tiering appliance 110 of the multi-tier storage system 104 is configured to move data between the fast tier 106 and the capacity tier 108, for example, by moving data files or other data objects between the PFS nodes 112 of the fast tier 106 and the OBS nodes 114 of the capacity tier 108. It is assumed in this embodiment that the cloud tiering appliance 110 is separate from the fast tier 106 and the capacity tier 108. However, numerous other arrangements are possible. For example, the cloud tiering appliance 110 can be implemented at least in part utilizing at least a subset of the PFS nodes 112 of the fast tier 106.

A given one of the data objects is transferred between the fast tier 106 and the capacity tier 108 utilizing the cloud tiering appliance 110. The given data object may comprise a single data file, or multiple data files.

The cloud tiering appliance 110 in some embodiments comprises configurable data mover modules adapted to interact with the fast tier 106 and the capacity tier 108. At least one configuration file is implemented in or otherwise associated with the cloud tiering appliance 110. The state of the configuration file may be controlled at least in part by a job scheduler implemented as part of the computer system 101. The job scheduler interacts with an inter-tier data movement policy engine that is also assumed to be part of the computer system 101 in this embodiment. In other embodiments, at least one of the job scheduler and the inter-tier data movement policy engine may be implemented at least in part externally to the computer system 101. For example, one or both of these components may be implemented within the multi-tier storage system 104.

The cloud tiering appliance 110 in the present embodiment can alter a manner in which data is moved between the fast tier 106 and the capacity tier 108 based at least in part on a change in state of the configuration file.

The cloud tiering appliance 110 can include at least one API that permits an external component to control selection between various modes of operation. For example, the above-noted job scheduler can access the configuration file via such an API in order to control the mode of operation of the cloud tiering appliance 110.

Additionally or alternatively, an application running on one or more of the compute nodes 102 can access the configuration file via the API in order to control the mode of operation of the cloud tiering appliance 110.

In some embodiments, the cloud tiering appliance 110 is configurable via the configuration file in a mode of operation in which a particular type of data movement between the fast tier 106 and the capacity tier 108 occurs for a given data file being utilized by an application running on one or more of the compute nodes 102. In an arrangement of this type, the cloud tiering appliance 110 can be placed in a mode of operation in which particular types of data movement are performed for certain data files based at least in part on extended attributes of those data files as established via the parallel file system. Additional or alternative operating modes can be used in other embodiments.

Furthermore, other embodiments can configure the cloud tiering appliance 110 in different modes of operation without the use of a configuration file. Thus, such a configuration file should not be viewed as a requirement.

Although the multi-tier storage system 104 is shown in FIG. 1 as being entirely separate from the computer system 101, this is by way of illustrative example only. In other embodiments, at least a subset of the PFS nodes 112-1, . . . 112-M of the fast tier 106 may be implemented in respective ones of the compute nodes 102. Numerous other alternative system configurations are also possible.

Accordingly, a given one of the PFS nodes 112-1, . . . 112-M of the fast tier 106 may in some embodiments be associated with a flash memory device, a 3D XPoint device, an NVRAM device or another type of non-volatile memory device of one of the compute nodes 102, or another type of storage device of such a compute node. In an arrangement of this type, at least one of the compute nodes 102 implements at least a portion of the fast tier 106 of the multi-tier storage system 104.

Processing devices utilized to implement system components such as the cloud tiering appliance 110, PFS nodes 112 and OBS nodes 114 are assumed to be interconnected with one another using high-speed connections. For example, data can be moved between these and other system components using remote direct memory access (RDMA) connections over Gigabit Ethernet ("GbE") or InfiniBand ("IB"). As another example, some embodiments can be configured to utilize an Intel Omni-Path Host Fabric Interface (OP HFI). Numerous other types of connections and associated data transfer protocols can be used in other embodiments, including Fibre Channel.

In some embodiments, the fast tier 106 is implemented at least in part using software-defined storage such as ScaleIO™ or ViPR® both of which are commercially available from Dell EMC of Hopkinton, Mass. Additional details regarding ScaleIO™ functionality that can be incorporated into a multi-tier storage system in illustrative embodiments can be found in, for example, EMC ScaleIO™ User Guide, V1.32, Document No. 302-001-033, Rev. 11, May 2015, which is incorporated by reference herein.

The capacity tier 108 in some embodiments is implemented at least in part utilizing a scale-out network-attached storage (NAS) cluster and/or an object store.

For example, the capacity tier 108 can include a scale-out NAS cluster implemented using Isilon® platform nodes and associated accelerators in the S-Series, X-Series and NL-Series product lines, all commercially available from Dell EMC.

Additionally or alternatively, the capacity tier 108 can include an object store implemented using cloud storage such as Elastic Cloud Storage (ECS) from Dell EMC. Other examples of object stores that can be used in a given embodiment include object stores implemented using object-based storage products such as Atmos, also from Dell EMC.

The capacity tier 108 in some embodiments includes an object store that is part of the same cloud infrastructure that provides the compute nodes 102. Examples of cloud-based object stores that can be utilized for object store in some embodiments include Amazon Simple Storage Service (S3), GCP Cloud Storage, and Microsoft Azure Blob Storage.

A given such object store of the capacity tier 108 is configured to store a plurality of objects. Each of the objects stored in the object store is assumed to have a unique object identifier (OID). It is also possible that the capacity tier 108 could comprise multiple object stores, or other types of object storage.

Again, the fast tier 106, capacity tier 108 and cloud tiering appliance 110 are all assumed to be part of the multi-tier storage system 104 of information processing system 100, although other arrangements are possible in other embodiments. For example, components such as cloud tiering appliance 110 in other embodiments can be implemented at least in part externally to the multi-tier storage system 104.

Also, it should be noted that cloud tiering appliance 110 that is shown as separate from the fast tier 106 and capacity tier 108 in the FIG. 1 embodiment can be implemented at least in part within at least one of the tiers. For example, at least portions of the cloud tiering appliance 110 can be implemented in a distributed manner using storage nodes that are used to implement respective portions of at least one of the fast and capacity tiers.

It is assumed that the fast tier 106 has a relatively high input-output processing speed and a relatively low capacity and the capacity tier 108 has a relatively low input-output processing speed and a relatively high capacity, although other types of multi-tier storage systems can be used in other embodiments.

The cloud tiering appliance 110 is illustratively coupled to the fast tier 106 and the capacity tier 108 and configured to control transfer of data between these storage tiers. The term "data movement" as used in this and other contexts herein is intended to be broadly construed, so as to encompass data relocation as well as other types of movement of data between storage tiers of a multi-tier storage system. A given data mover module can be implemented at least in part on storage arrays or other storage platforms that implement at least portions of one or more of the storage tiers of the multi-tier storage system 104.

In the FIG. 1 embodiment, the cloud tiering appliance 110 further comprises a stub generator 116 and a policy engine 118. Such components are illustratively implemented at least in part in the form of software running on a processing platform or processing device that implements the cloud tiering appliance 110. The cloud tiering appliance 110 itself may be implemented in one or more containers of the processing platform, or using other arrangements of physical or virtual processing devices.

The PFS implemented by the fast tier 106 in the present embodiment comprises a user visible name space and a corresponding hidden data store. Examples of these two distinct portions of the PFS can be seen as respective elements 318 and 320 of FIG. 3 in the 64-bit Unix File System ("UFS64") utilized in that embodiment. The UFS64 file system is implemented in the FIG. 3 embodiment in combination with one or more higher-layer file systems in an NAS library 310 of a processing platform. A wide variety of other types of file systems can be used in other embodiments.

The cloud tiering appliance 110 is more particularly configured to controllably relocate files from the hidden data store of the PFS of the fast tier 106 to the cloud-based object store of the capacity tier 108.

In conjunction with the relocation of a given one of the files, the given file is replaced in the hidden data store with a corresponding stub providing user access via the user visible name space to an object comprising the given file in the cloud-based object store of the capacity tier 108. The stub in this embodiment is generated by the stub generator 116 of the cloud tiering appliance 110.

The controllable relocation of the files from the hidden data store of the PFS of the fast tier 106 to the cloud-based object store of the capacity tier 108 is performed in accordance with one or more policies configured by the policy engine 118 of the cloud tiering appliance 110. For example, the policy engine 118 can be configured to determine which of a plurality of files of the hidden data store of the PFS of the fast tier 106 will be controllably relocated to the cloud-based object store of the capacity tier 108.

The files that are controllably relocated from the hidden data store of the PFS of the fast tier 106 to the cloud-based object store of the capacity tier 108 illustratively comprise respective compressed and deduplicated files of the hidden data store of the PFS that also have corresponding stubs in the user visible name space.

Write operations against files that have been controllably relocated from the hidden data store of the PFS of the fast tier 106 to the cloud-based object store of the capacity tier 108 are cached locally in the fast tier 106 and subsequently pushed to the cloud-based object store so as to enhance write performance.

As indicated previously, each of the fast tier 106 and the capacity tier 108 of the multi-tier storage system 104 comprises a plurality of storage devices with different types of storage devices being used in different ones of the storage tiers. For example, the fast tier 106 may comprise flash drives while the capacity tier 108 comprises hard disk drives or solid state drives. The particular storage devices used in a given storage tier may be varied in other embodiments, and multiple distinct storage device types may be used within a single storage tier. The term "storage device" as used herein is intended to be broadly construed, so as to encompass, for example, flash drives, hard disk drives, solid state drives, hybrid drives or other types of storage devices.

The storage devices utilized in the fast tier 106 are generally significantly faster in terms of read and write access times than the storage devices utilized in the capacity tier 108. Accordingly, the fast tier 106 in some embodiments is a relatively small storage tier optimized for IO processing speed, while the capacity tier 108 is a relatively large but slower storage tier optimized for storage capacity. Terms such as "fast" and "slow" in this context are relative terms and not intended to denote any particular absolute performance level. However, numerous alternative tiering arrangements may be used, including arrangements with three or more tiers each providing a different level of performance. Such alternative arrangements can include, for example, one or more intermediate storage tiers arranged between the front-end and back-end storage tiers of a multi-tier storage system 104.

The term "multi-tier storage system" as used herein is therefore intended to be broadly construed so as to encompass any of a wide variety of different arrangements of storage tiers. The term "storage tier" as used herein is also intended to be broadly construed, and may comprise, for example, a single storage array or a single-tier storage system.

In some embodiments, flash storage devices are utilized to implement at least portions of fast tier 106, and a scale-out NAS cluster and/or an object store utilized to implement at least a portion of capacity tier 108. In such an arrangement, an IO dispatcher software layer of the storage system may be configured to provide at least a portion of the cloud tiering appliance 110. For example, such an IO dispatcher software layer can be used to pre-fetch data from the capacity tier 108 into the fast tier 106, as well as to support other types of data movement.

The cloud tiering appliance 110 may be configured to control movement of data between the fast tier 106 and the capacity tier 108 in order to facilitate achievement of desired levels of performance by system users.

The "users" in this embodiment may refer, for example, to respective ones of the compute nodes 102, although the term "user" as utilized herein is intended to be broadly construed so as to encompass numerous other arrangements of human, hardware, software or firmware entities, as well as combinations of such entities.

The cloud tiering appliance 110 can communicate with the compute nodes 102, fast tier 106 and capacity tier 108 via one or more networks or other types of communication media. In distributed implementations, different modules or other portions of a given distributed system component such as cloud tiering appliance 110 can be implemented in respective ones of a plurality of storage nodes.

It is to be appreciated that these and other features of illustrative embodiments are presented by way of example only, and should not be construed as limiting in any way.

Accordingly, different numbers, types and arrangements of system components such as compute nodes 102, fast tier 106, capacity tier 108 and cloud tiering appliance 110 can be used in other embodiments.

The fast tier 106, capacity tier 108, cloud tiering appliance 110 and possibly other elements of the system 100 can be implemented using one or more storage platforms. For example, a given storage platform can comprise any of a variety of different types of storage including storage area networks (SANs), direct-attached storage (DAS) and distributed DAS, as well as combinations of these and other storage types, including software-defined storage.

A given storage platform may comprise storage arrays such as VNXx and Symmetrix VIVIAX® storage arrays, flash hybrid storage arrays such as Unity™, or scale-out all-flash storage arrays such as XtremIO™, all commercially available from Dell EMC. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). At least portions of the fast tier 106, the capacity tier 108 and the cloud tiering appliance 110 may be implemented at least in part using processing devices of such processing platforms.

For example, a distributed implementation of the cloud tiering appliance 110 illustratively comprises a plurality of distributed data mover modules implemented in respective LXCs running on respective ones of the compute nodes 102 or on storage nodes of the fast tier 106 or capacity tier 108.

Communications between the various elements of system 100 may take place over one or more networks not explicitly shown. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as Gigabit Ethernet, InfiniBand, Omni-Path Host Fabric Interface or Fibre Channel. Numerous alternative networking arrangements are possible in a given embodiment, as will be appreciated by those skilled in the art.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

As indicated previously, the fast tier 106 in other embodiments can be implemented using storage devices and associated storage servers of at least a subset of the compute nodes 102. For example, a given one of the compute nodes 102 as illustrated can include a PFS storage server associated with local flash storage devices of the compute node. Other ones of the compute nodes 102 may similarly implement respective PFS storage servers and associated local flash storage devices so as to collectively provide the fast tier 106. The capacity tier 108 in some embodiments is implemented using storage nodes each comprising an OBS storage server and one or more corresponding storage devices.

The operation of the information processing system 100 will now be described in further detail with reference to the flow diagram of FIG. 2. The process as shown includes steps 200 through 206, and is suitable for use in the system 100 but is more generally applicable to other types of systems comprising a multi-tier storage system with controllable relocation of files from a file system tier to a cloud-based object storage tier. These other systems illustratively include system 300, 400 and 500 to be described in conjunction with respective FIGS. 3, 4 and 5.

In step 200, a multi-tier storage system is configured to include at least first and second storage tiers each comprising multiple storage devices. As mentioned previously, the multi-tier storage system in some embodiments implements a fast tier comprising a parallel file system and a capacity tier comprising one or more object stores.

In step 202, a file system having a user visible name space and a corresponding hidden data store is implemented in the first storage tier, and a cloud-based object store is implemented in the second storage tier.

Figure 2:
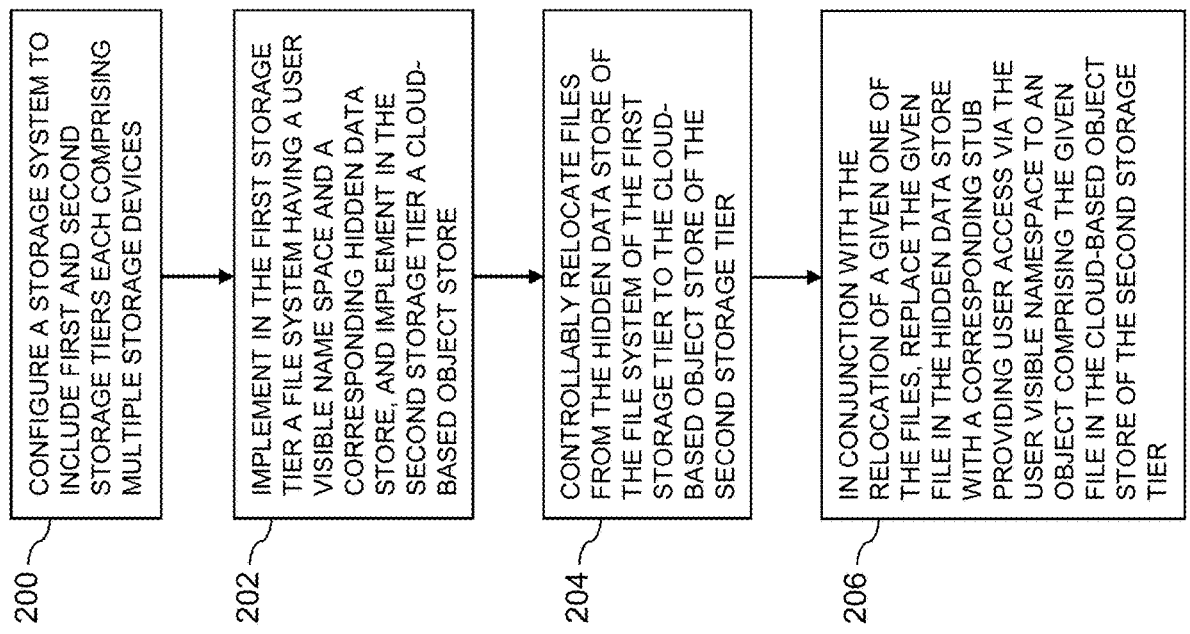
FIG. 2 is a flow diagram of a process for controllable relocation of files from a file system hidden data store to a cloud-based object store.

With reference by way of example to the previously-described FIG. 1 embodiment, the first and second storage tiers of the FIG. 2 process illustratively comprise the respective fast tier 106 and capacity tier 108.

The file system referenced in step 200 is implemented at least in part utilizing a UFS64 file system in combination with one or more higher-layer file systems in an NAS storage library of a processing platform, such as Cluster File System (CFS), Network File System (NFS) and Common Internet File System (CIFS). Embodiments of this type will be described in greater detail below in conjunction with FIGS. 3, 4 and 5. A wide variety of other file systems can be used, including by way of example Orange File System (OFS), General Parallel File System (GPFS) and Parallel Virtual File System (PVFS), as well as combinations of multiple ones of these and other file systems.

In step 204, files from the hidden data store of the file system of the first storage tier are controllably relocated to the cloud-based object store of the second storage tier.

Movement of data between the storage tiers of the multi-tier storage system is illustratively controlled by a cloud tiering appliance configured to perform data movement operations such as movement of data files from a storage node of the fast tier to a storage node of the capacity tier and vice-versa. Other arrangements of one or more data mover modules can be used in place of or in addition to a cloud tiering appliance.

In step 206, in conjunction with the relocation of a given one of the files, the given file in the hidden data store is replaced with a corresponding stub providing user access via the user visible name space to an object comprising the given file in the cloud-based object store of the second storage tier.

The files that are controllably relocated from the hidden data store of the file system of the first storage tier to the cloud-based object store of the second storage tier illustratively comprise respective compressed and deduplicated files of the hidden data store of the file system. Such files are also assumed to have respective corresponding stubs in the user visible name space of the file system.

Write operations against files that have been controllably relocated from the hidden data store of the file system of the first storage tier to the cloud-based object store of the second storage tier can be cached locally in the first storage tier and subsequently pushed to the cloud-based object store so as to enhance write performance.

Numerous different conditions can lead to movement of data between the storage tiers in the FIG. 2 embodiment and other embodiments disclosed herein. For example, data movement between a capacity tier and a fast tier can be scheduled to occur before a given compute job begins, or at various points during the compute job as it executes.

In some embodiments, a cloud tiering appliance is controlled at least in part via one or more configuration files accessible via an API. Various types of tiering that can be provided include eager tiering, in which files are moved from a capacity tier to a fast tier prior to start of a compute job, and lazy tiering, in which files are moved from the capacity tier to the fast tier at the time the files are first opened. On-demand delivery can also be provided, in which IO from data files is delivered directly to an application running on one or more compute nodes only upon request. Similar policies are implemented for movement from the fast tier to the capacity tier when a given file is closed and placed on a "dirty list" within the PFS. Files on the "dirty list" include those files that are being written by one or more applications.

It is to be appreciated that the FIG. 2 process can be adapted for use with a wide variety of other types of multi-tier storage systems, including by way of example a multi-tier storage system comprising an NAS cluster implemented using software-defined storage.

The particular processing operations and other system functionality described in conjunction with the flow diagram of FIG. 2 are presented by way of illustrative example only, and should not be construed as limiting the scope of the embodiments in any way. Alternative embodiments can use other types of processing operations involving a multi-tier storage system that provides controllable relocation of files from file system tier to cloud-based object storage tier. For example, the ordering of the process steps may be varied in other embodiments, or certain steps may be performed concurrently with one another rather than serially. Also, one or more of the process steps may be repeated periodically, or multiple instances of the process can be performed in parallel with one another in order to implement a plurality of different storage system instances and associated data movement between storage tiers within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Numerous other embodiments of information processing systems comprising compute nodes and a multi-tier storage system can be configured utilizing the techniques disclosed herein. Such embodiments can utilize a wide variety of additional or alternative storage tiering and data movement arrangements.

It should therefore be understood that the particular system configurations and operations described above are presented by way of illustrative example only, and should not be construed as limiting in any way. Numerous alternative configurations of compute nodes, storage tiers, cloud tiering appliances and other system elements can be used in other embodiments. For example, although some embodiments utilize particular types of parallel file systems, the disclosed techniques can be extended in a straightforward manner to any of a wide variety of alternative file systems.

In these and other embodiments, a multi-tier storage system can be offered to cloud infrastructure customers as a platform-as-a-service offering.

Additional illustrative embodiments implementing multi-level file tiering will now be described with reference to FIGS. 3 through 5.

Figure 3:
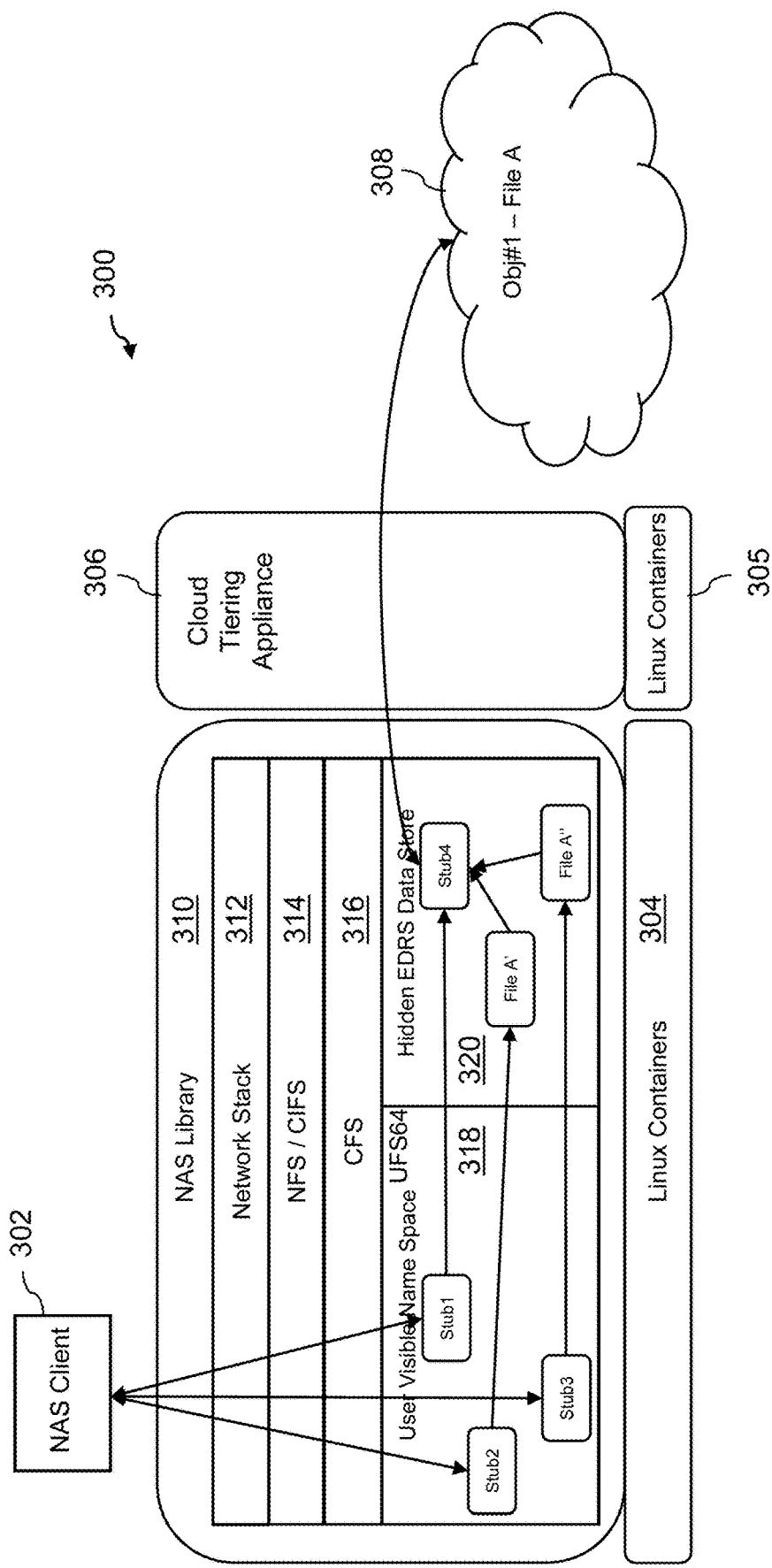
FIGS. 3, 4 and 5 are block diagrams of other information processing systems implementing controllable relocation of files from a file system hidden data store to a cloud-based object store in respective illustrative embodiments.

Referring initially to FIG. 3, an information processing system 300 comprises an NAS client 302 that interacts with a first storage tier of a multi-tier storage system. The NAS client 302 and other clients or corresponding client devices referred to herein may be incorporated in or otherwise associated with a given compute node of a computer system that utilizes the multi-tier storage system.

The first tier of the multi-tier storage system more particularly comprises an NAS storage tier implemented at least in part utilizing software-defined storage such as the above-noted ScaleIO™ software-defined storage from Dell EMC. The NAS storage tier is implemented in Linux containers 304 of a processing platform. These and other Linux containers referred to herein may more particularly comprise Docker containers.

The NAS storage tier in this embodiment implements a UFS64 file system having a user visible name space 318 and a corresponding hidden data store 320. The UFS64 file is implemented in combination with higher-layer file systems in an NAS library 310 of the NAS storage tier. The NAS library 310 more particularly comprises a network stack 312, NFS and/or CIFS layer 314, and CFS layer 316. The UFS64 file system comprising user visible name space 318 and corresponding hidden data store 320 is implemented in this embodiment below the CFS layer 316, although the various layers and file systems of the NAS library 310 are presented by way of example only and can be varied in other embodiments.

The hidden data store 320 in this embodiment more particularly comprises a hidden EDRS data store, where EDRS denotes EMC Data Reduction Services from Dell EMC. The hidden EDRS data store illustratively provides functionality referred to as File Redundant Data Elimination (FRDE). One possible alternative file system that may be utilized in the hidden EDRS data store is a UFS32 file system. Numerous other hidden data stores and associated file systems can be used.

The information processing system 300 further comprises additional Linux containers 305 that implement at least one cloud tiering appliance 306. The Linux containers 305 used to implement the cloud tiering appliance 306 may be part of the same processing platform that provides Linux containers 304. Alternatively, Linux containers 305 may be part of a separate processing platform. The cloud tiering appliance 306 is assumed to be configured in a manner similar to that previously described for cloud tiering appliance 110 of the FIG. 1 embodiment. Accordingly, cloud tiering appliance 306 illustratively includes stub generator and policy engine components. The cloud tiering appliance 306 is illustratively implemented in Linux containers 305 that are part of a processing platform providing a software-defined NAS cluster comprising multiple storage nodes.

The second tier of the multi-tier storage system more particularly comprises a cloud-based object store 308. The cloud-based object store 308 of the second storage tier may comprise a plurality of object storage nodes. Stored objects of the cloud-based object store 308 are assumed to have respective unique object identifiers. It is also assumed that the cloud-based object store 308 is accessible to the cloud tiering appliance 306 over one or more networks that are not explicitly shown in the figure.

The cloud tiering appliance 306 in the multi-tier storage system of the FIG. 3 embodiment is configured to controllably relocate files from the hidden data store 320 of the UFS64 file system of the first storage tier to the cloud-based object store 308 of the second storage tier.

In conjunction with the relocation of a given one of the files, the given file is replaced in the hidden data store 320 with a corresponding stub providing user access via the user visible name space 318 to an object comprising the given file in the cloud-based object store of the second storage tier. For example, Obj#1 uniquely identifies a particular object comprising a file denoted File A. It is assumed that File A is a file that has been relocated from the hidden data store 320 under the control of the cloud tiering appliance 306 and has been replaced in that hidden data store 320 with a corresponding stub.

The user visible name space 318 accessible to the NAS client 302 illustratively includes multiple stubs that correspond to files in the hidden data store 320. For example, stubs denoted stub 1, stub 2 and stub 3 correspond respectively to File A, File A' and File A". Stub 1 pointed directly to File A in the hidden data store 320 before that file was relocated to the cloud-based object store 308 and replaced in the hidden data store 320 with an additional stub denoted stub 4. After that movement of File A, stub 1 points indirectly to File A in Obj#1 of the cloud-based object store 308 via stub 4 of the hidden data store 320. Stubs 2 and 3 point to the respective files File A' and File A" in the hidden data store 320.

The files File A' and File A" in the hidden data store 320 illustratively represent subsequent variants of File A associated with writes by NAS client 302 or other NAS clients of the system 300. The system 300 includes functionality for caching writes locally in the first storage tier before eventually reconciling those writes with instances of corresponding files stored in the hidden data store 320. Prior to the relocation of File A from the hidden data store 320 to the cloud-based object store 308, there is a one-to-one correspondence between the stubs of the user visible name space 318 and the files of the hidden data store 320. As noted above, in conjunction with the relocation of File A from the hidden data store 320 to the cloud-based object store 308, File A is replaced in the hidden data store 320 with stub 4. This stub is generated by the cloud tiering appliance 306, and points to Obj#1 containing File A in the cloud-based object store 308. The files File A' and File A" in the hidden data store 320 each point to stub 4. Accordingly, stubs 1, 2, 3 and 4 are all associated with File A or its variants.

The first storage tier comprising NAS library 310 in this embodiment is assumed to be coupled to the second storage tier comprising cloud-based object store 308 via the cloud tiering appliance 306 that is configured to generate the stub denoted stub 4 that replaces File A in the hidden data store 320.

The controllable relocation of files from the hidden data store 320 of the UFS64 file system of the first storage tier to the cloud-based object store 308 of the second storage tier is illustratively performed in accordance with one or more configured policies of the cloud tiering appliance 306. For example, the cloud tiering appliance 306 in some embodiments comprises a policy engine similar to policy engine 118 of the FIG. 1 embodiment. Such a policy engine is configured to determine which of a plurality of files of the hidden data store 320 will be controllably relocated to the cloud-based object store 308.

The files that are controllably relocated from the hidden data store 320 of the UFS64 file system of the first storage tier to the cloud-based object store 308 of the second storage tier are assumed to comprise respective compressed and deduplicated files of the hidden data store 320 of the UFS64. As noted above, each such file is assumed to have a corresponding stub in the user visible name space 318. The system 300 is advantageously configured to leverage existing file level compression and deduplication infrastructure of the NAS library 310 of the first storage tier. Deduplicated files in the hidden data store 320 are illustratively replaced with hard links to a single copy of the corresponding file. Reads can be made from a given such file without uncompressing the entire file. A wide variety of different compression and deduplication algorithms can be supported in the system 300.

The system 300 provides transparent tiering of compressed and deduplicated files from the hidden data store 320 to the cloud-based object store 308 while also preserving the advantageous features of the NAS library 310 and its UFS64 file system comprising user visible name space 318 and hidden data store 320.

Write operations performed against files that have been controllably relocated from the hidden data store 320 of the UFS64 file system of the first storage tier to the cloud-based object store 308 of the second storage tier are cached locally in the first storage tier and subsequently pushed to the cloud-based object store so as to enhance write performance. For example, as indicated previously, the files denoted File A' and File A" in hidden data store 320 may be created through such write operations and each points to stub 4 that in turn points to Obj#1 containing File A in the cloud-based object store 308.

In conjunction with the above-noted local caching of writes, the cached writes for each file can be monitored and the total number of newly-written blocks of each such file compared to a designated threshold of newly-written blocks. Once the number of cached writes for a given file crosses the designated threshold, the file can once again be subject to compression and deduplication and then made a candidate for tiering from the hidden data store 320 to the cloud-based object store 308. Other types of local caching arrangements can be used in other embodiments.

The system 300 of FIG. 3 is illustratively configured such that the hidden data store 320 can determine which files are subject to local tiering within that data store. This determination can be made using an internal policy engine of the UFS64 file system. The identified files are subject to compression and deduplication operations which can potentially free up space within the UFS64 file system. Portions of such-freed up space may be returned to the underlying processing platform comprising Linux containers 304.

The cloud tiering appliance 306 can determine which of the compressed and deduplicated files of the hidden data store will be subject to offloading to the cloud-based object store 308. Logic implemented in the cloud tiering appliance 306 controls the uploading of a given file to the cloud-based object store 308 and in conjunction with such uploading a corresponding stub is generated and deposited in the hidden data store 320. The files subject to uploading are illustratively already compressed and deduplicated in the hidden data store 320. The uploading itself will therefore be much more efficient as compressed data will be sent over the network from the cloud tiering appliance 306 to the cloud-based object store 308 without the cloud tiering appliance 306 having to perform such compression.

Figure 4:
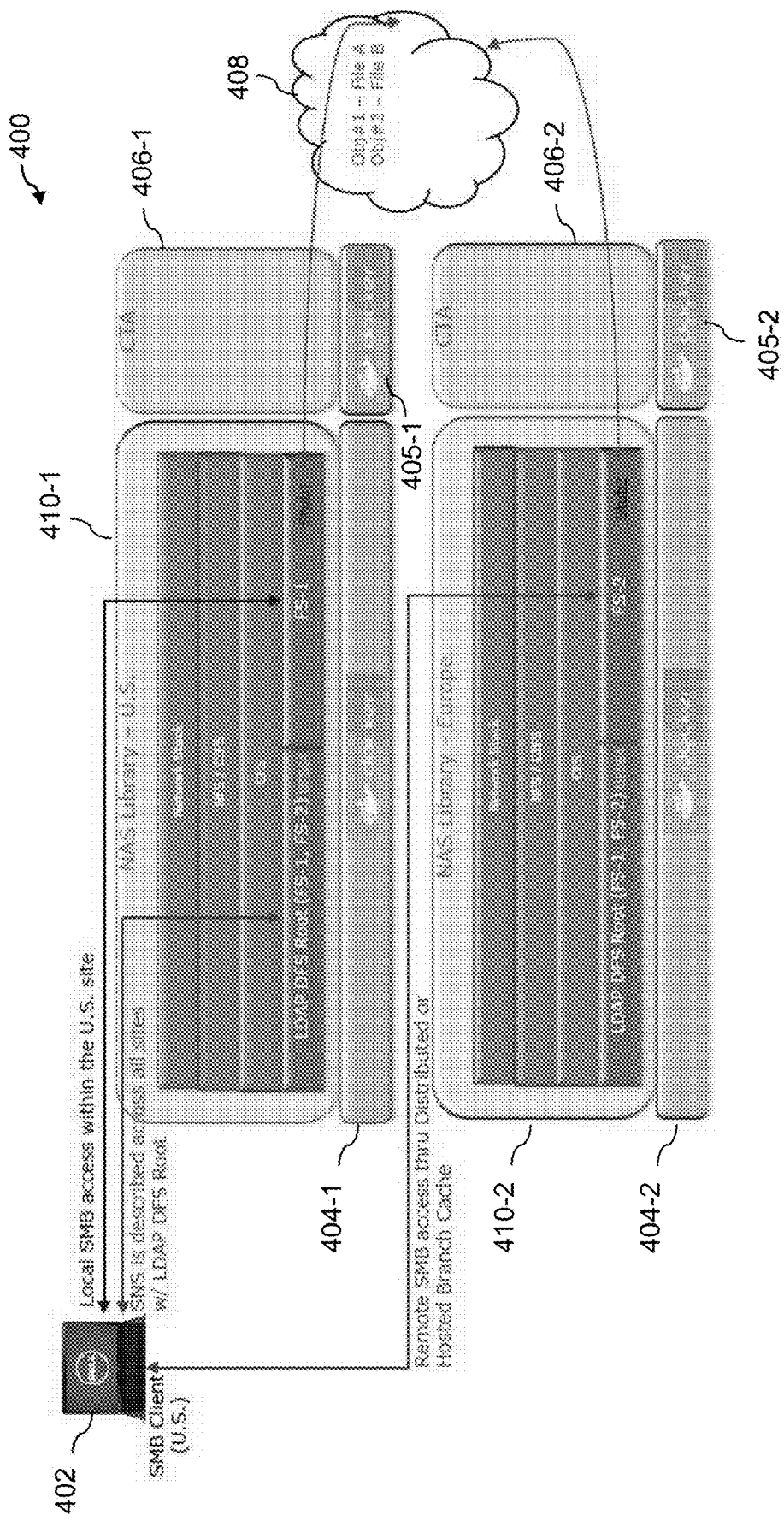

FIG. 4 shows another information processing system 400 implementing controllable relocation of files from a file system hidden data store to a cloud-based object store. In this embodiment, system 400 comprises a multi-tier storage system that includes first and second storage tiers.

The first storage tier comprises a distributed storage tier comprising a plurality of file system nodes comprising respective sets of Docker containers 404-1 and 404-2 implementing respective NAS libraries 410-1 and 410-2. The file system nodes of the first storage tier further comprise respective sets of Docker containers 405-1 and 405-2 implementing respective cloud tiering appliances (CTAs) 406-1 and 406-2.

Each of NAS libraries 410 of system 400 is assumed to be configured in a manner similar to that previously described for NAS library 310 of FIG. 3. The NAS libraries 410-1 and 410-2 therefore implement respective UFS64 file systems that each include a user visible name space and a corresponding hidden data store. More particularly, NAS libraries 410-1 and 410-2 comprise respective UFS64 file systems denoted FS-1 and FS-2.

These file systems FS-1 and FS-2 are implemented on respective separate ones of the file system nodes of the distributed first storage tier. For example, the file system node comprising NAS library 410-1 is denoted in the figure as being part of a U.S. site and the file system node comprising NAS library 410-2 is denoted in the figure as being part of a European site. Each such site illustratively comprises a separate data center or other type of processing platform implemented in the corresponding geographic region. These file system nodes of the first storage tier collectively provide a single name space. The single name space in this embodiment is a Server Message Block (SMB) name space, although other protocols can be used in other embodiments.

The multi-tier storage system is utilized by an SMB client 402 assumed to be located in the U.S. The SMB client 402 has local SMB access within the U.S. site to the file system FS-1 of the NAS library 410-1. That client also has remote SMB access through a distributed or hosted branch cache to the file system FS-2 of the NAS library 410-2 at the European site.

The single name space or SNS is described across both the U.S. and European sites using a Lightweight Directory Access Protocol (LDAP) Distributed File System (DFS) root that encompasses both of the UFS64 file systems FS-1 and FS-2. The LDAP DFS root is illustratively implemented in both of the UFS64 file systems FS-1 and FS-2 of the respective NAS libraries 410-1 and 410-2.

The second storage tier of the multi-tier storage system of system 400 comprises a cloud-based object store 408. The cloud-based object store 408 of the second storage tier may comprise a plurality of object storage nodes. Stored objects of the cloud-based object store 408 are assumed to have respective unique object identifiers. It is also assumed that the cloud-based object store 408 is accessible to the cloud tiering appliances 406-1 and 406-2 over one or more networks that are not explicitly shown in the figure.

The cloud tiering appliances 406-1 and 406-2 in the multi-tier storage system of the FIG. 4 embodiment are configured to controllably relocate files from respective hidden data stores of UFS64 file systems FS-1 and FS-2 of the first storage tier to the cloud-based object store 408 of the second storage tier.

In conjunction with the relocation of a given one of the files from one of the UFS64 file systems FS-1 or FS-2 to the cloud-based object store 408 of the second storage tier, the given file is replaced in the hidden data store of its file system with a corresponding stub providing user access via the user visible name space to an object comprising the given file in the cloud-based object store 408.

For example, Obj#1 uniquely identifies a particular object comprising a file from the UFS64 file system FS-1 denoted File A. It is assumed that File A is a file that has been relocated from the hidden data store of the UFS64 file system FS-1 in NAS library 410-1 under the control of the cloud tiering appliance 406-1 and has been replaced in that hidden data store with a corresponding stub denoted Stub 1.

Similarly, Obj#2 uniquely identifies a particular object comprising a file from the UFS64 file system FS-2 denoted File B. It is assumed that File B is a file that has been relocated from the hidden data store of the UFS64 file system in NAS library 410-2 under the control of the cloud tiering appliance 406-2 and has been replaced in that hidden data store with a corresponding stub denoted Stub2.

Figure 5:
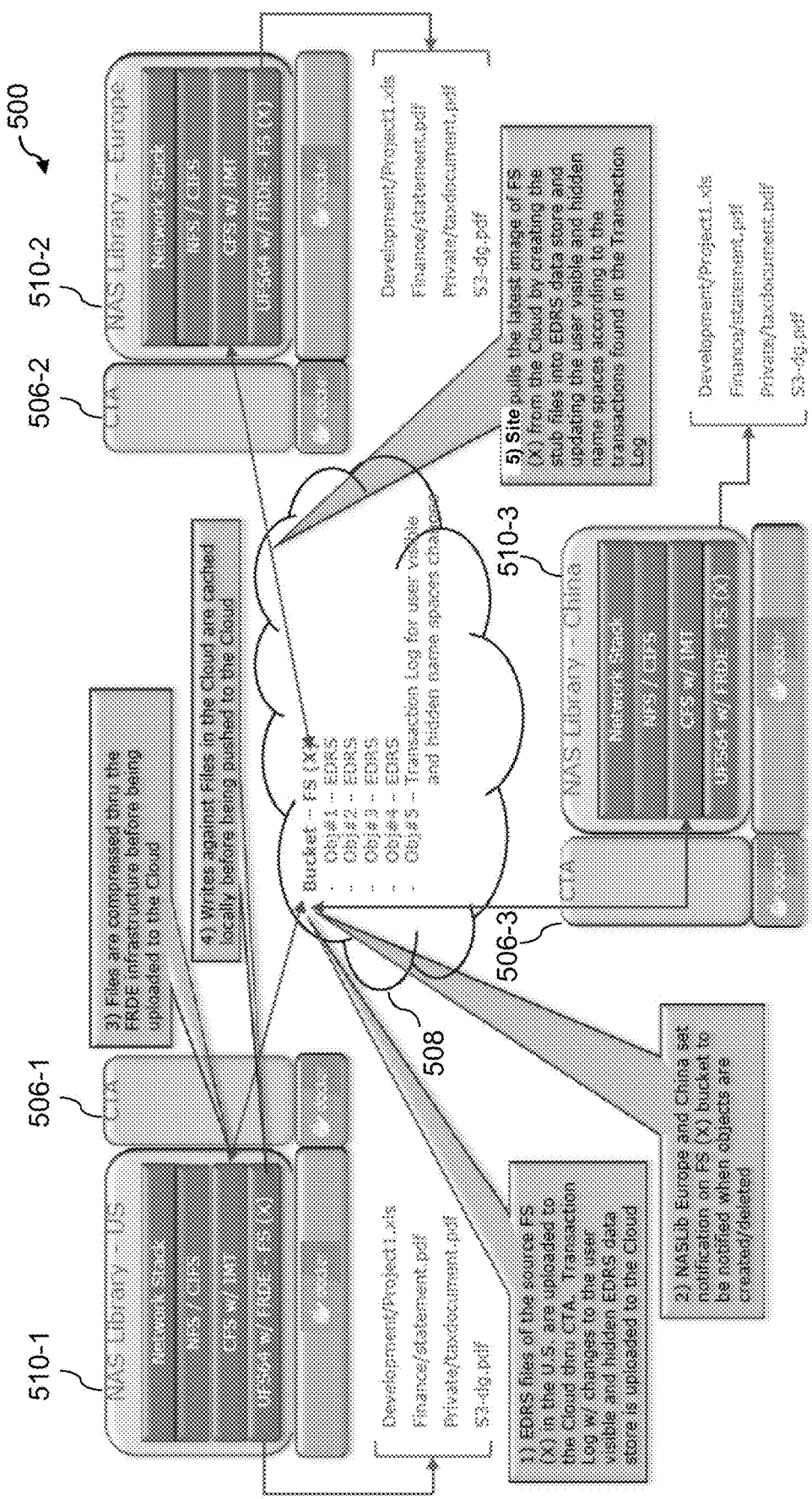

Another illustrative embodiment is shown in FIG. 5. In this embodiment, an information processing system 500 comprises a multi-tier storage system in which a first storage tier comprises a distributed storage tier implemented using multiple file system nodes at respective distinct geographic sites.

The first storage tier more particularly comprises three distinct file system nodes arranged at respective sites in the U.S., Europe and China. Each such site illustratively comprises a data center or other type of processing platform implementing the corresponding file system node. The first file system node at the U.S. site of system 500 comprises an NAS library 510-1 and a corresponding cloud tiering appliance 506-1. Similarly, the second and third file system nodes at the respective Europe and China sites of system 500 comprise respective NAS libraries 510-2 and 510-3 and corresponding respective cloud tiering appliances 506-2 and 506-3. Each of the NAS libraries 510 and cloud tiering appliances 506 of the system 500 is assumed to be configured in a manner similar to its corresponding component as previously described in conjunction with the embodiments of FIGS. 3 and 4.

Each of the file system nodes in the system 500 is assumed to implement a UFS64 file system in its corresponding one of the NAS libraries 510. The UFS64 file system is assumed to have a user visible name space and a corresponding hidden data store. The hidden data store in each of the UFS64 file systems is more particularly assumed to comprise a hidden EDRS data store having FRDE functionality. The UFS64 file systems in this embodiment collectively support a single file system denoted FS(X).

The second storage tier of the multi-tier storage system of system 500 comprises a cloud-based object store 508. The cloud-based object store 508 of the second storage tier may comprise a plurality of object storage nodes. Stored objects of the cloud-based object store 508 are assumed to have respective unique object identifiers. It is also assumed that the cloud-based object store 508 is accessible to the cloud tiering appliances 506-1, 506-2 and 506-3 over one or more networks that are not explicitly shown in the figure.

The cloud tiering appliances 506-1, 506-2 and 506-3 in the multi-tier storage system of the FIG. 5 embodiment are configured to controllably relocate files from respective hidden data stores of their respective UFS64 file systems of the first storage tier to the cloud-based object store 508 of the second storage tier.

In conjunction with the relocation of a given one of the files from one of the UFS64 file systems to the cloud-based object store 508 of the second storage tier, the given file is replaced in the hidden data store of its file system with a corresponding stub providing user access via the user visible name space to an object comprising the given file in the cloud-based object store 508. However, in this embodiment, a given file relocated from multiple ones of the hidden data stores into the cloud-based object store 508 has only a single corresponding object instance in the cloud-based object store but multiple stubs in respective ones of the multiple hidden data stores from which the given file was relocated.

More particularly, in this embodiment each of the file system nodes provides local client access to a designated set of files of the file system FS(X). The cloud-based object store 508 comprises a bucket that stores objects corresponding to respective ones of these files of the file system FS(X). The set of files of the file system F(X) in this embodiment comprises four files denoted as follows:

Development/Project1.xls
Finance/statement.pdf
Private/taxdocument.pdf
S3-dg.pdf The cloud-based object store 508 includes in its bucket for FS(X) an object for each of the above-listed files. The objects are denoted Obj#1, Obj#2, Obj#3 and Obj#4 and include respective ones of the four files. The cloud-based object store 508 also stores in its bucket for FS(X) another object denoted Obj#5 that includes a transaction log of changes to user visible and hidden data store name spaces of FS(X). Each of the objects in the bucket for FS(X) is assumed to have a corresponding stub in the hidden data stores of the FS(X) file system at respective ones of the multiple sites of system 500. Moreover, each site can refresh its view of both the user visible and hidden data store name spaces. For example, the above-noted object Obj#5 illustratively includes directory name space changes such that directory name space information at each of the sites can be updated as necessary.

Also shown in FIG. 5 is an example process carried out within the system 500 and involving interactions between multiple ones of the sites and the cloud-based object store 508. The process includes steps denoted in the figure as Step 1 through Step 5, each of which are described below.

In Step 1, EDRS files of the hidden data store of the file system FS (X) in the NAS library 510-1 of the U.S. site are uploaded to the cloud-based object store 508 via the cloud tiering appliance 506-1. A transaction log with changes to the user visible name space and hidden EDRS data store is also uploaded to the cloud-based object store 508.

In Step 2, the NAS libraries 510-2 and 510-3 of the respective Europe and China sites set notifications on the FS (X) bucket of the cloud-based object store 508 so as to be notified when objects are created or deleted in that bucket.

In Step 3, in conjunction with the uploading of the files to the cloud, the files are first compressed using FDRE infrastructure.

In Step 4, writes against the files stored as respective objects in the cloud-based object store 508 are cached locally within their respective sites before those files are updated and pushed to the cloud-based object store 508.

In Step 5, the NAS library 510-2 of the Europe site pulls the latest image of FS (X) from the cloud-based object store 508 by creating corresponding stub files in the hidden EDRS data store and updating the user visible and hidden name spaces in accordance with the transactions found in the transaction log.

It is to be appreciated that the particular configurations, operations and other features of systems 300, 400 and 500 described in conjunction with respective FIGS. 3, 4 and 5 are presented by way of illustrative example only, and numerous other configurations of additional or alternative components can be utilized to provide controllable relocation of files from a file system tier to a cloud-based object store in other embodiments.

Illustrative embodiments of multi-tier storage systems as disclosed herein can provide a number of significant advantages relative to conventional arrangements.

For example, some embodiments can configure a cloud storage tiering appliance to control relocation of a given data file between a parallel file system of a fast tier and an object store of a capacity tier in a multi-tier storage system.

Such an arrangement provides a highly efficient multi-level tiering solution while also providing optimized write performance against tiered files. A given embodiment can provide a single solution with multi-level file tiering both within a file system of a first storage tier and out to a second storage tier in the cloud while also supporting local caching of writes for targeted files in the file system of the first storage tier.

Illustrative embodiments can increase storage system throughput while also making better use of available storage system resources.

These and other embodiments can advantageously provide significantly improved data transfer efficiency relative to conventional techniques commonly utilized in multi-tier storage systems.

As a result of the significantly improved data transfer efficiency, improved computational performance is achievable in computer systems and in numerous other contexts involving tiered storage.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that at least portions of a given information processing system such as systems 100, 300, 400 and 500 of respective FIGS. 1, 3, 4 and 5 as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. Designated portions of certain system components such as compute nodes 102 and multi-tier storage system 104 are illustratively implemented for use by respective tenants of such a multi-tenant environment.

As mentioned previously, cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the systems 100, 300, 400 and 500. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered examples of illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of compute nodes 102 and multi-tier storage system 104 comprising fast tier 106, capacity tier 108 and cloud tiering appliance 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute nodes, storage systems, storage tiers, storage devices, file systems, object stores and cloud tiering appliances. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising:
    a storage system comprising at least first and second storage tiers each comprising a plurality of storage devices, the storage system being implemented at least in part by at least one processing device comprising a hardware processor coupled to a memory;
    the first storage tier implementing a file system having a user visible name space and a corresponding hidden data store;
    the second storage tier implementing a cloud-based object store;
    the storage system being configured to controllably relocate files from the hidden data store of the file system of the first storage tier to the cloud-based object store of the second storage tier;
    wherein in conjunction with the relocation of a given one of the files, the given file is replaced in the hidden data store with a corresponding stub providing user access via the user visible name space to an object comprising the given file in the cloud-based object store of the second storage tier;
    wherein the user visible name space comprises a plurality of additional stubs;
        a first subset of the plurality of additional stubs of the user visible name space pointing to respective files stored in the hidden data store; and
        a second subset of the plurality of additional stubs of the user visible name space pointing to the corresponding stub in the hidden data store that points to the object comprising the given file stored in the cloud-based object store of the second storage tier;
    wherein the first subset of the plurality of additional stubs of the user visible name space includes first and second additional stubs, the first and second additional stubs pointing to respective first and second variants of the given file associated with first and second writes by one or more clients to the given file subsequent to relocation of the given file to the cloud-based object store of the second storage tier, the first and second variants being cached locally in the hidden data store;
    wherein the first and second variants of the given file cached locally in the hidden data store each point to the corresponding stub in the hidden data store that points to the object comprising the given file stored in the cloud-based object stored of the second storage tier.

2. The apparatus of claim 1 wherein controllable relocation of the files from the hidden data store of the file system of the first storage tier to the cloud-based object store of the second storage tier comprises relocation performed in accordance with one or more configured policies.

3. The apparatus of claim 1 wherein the first storage tier comprises a network-attached storage tier implemented at least in part utilizing software-defined storage.

4. The apparatus of claim 1 wherein the file system of the first storage tier is implemented in one or more containers of a processing platform.

5. The apparatus of claim 1 wherein the first storage tier is coupled to the second storage tier via at least one cloud tiering appliance configured to generate the corresponding stub that replaces the given file in the hidden data store.

6. The apparatus of claim 5 wherein the cloud tiering appliance comprises a policy engine configured to determine which of a plurality of files of the hidden data store will be controllably relocated to the cloud-based object store.

7. The apparatus of claim 5 wherein the cloud tiering appliance is implemented in one or more containers of a processing platform.

8. The apparatus of claim 1 wherein the file system having the user visible name space and the corresponding hidden data store comprises a UFS64 file system implemented in combination with one or more higher-layer file systems in a network-attached storage library of a processing platform.

9. The apparatus of claim 1 wherein the files that are controllably relocated from the hidden data store of the file system of the first storage tier to the cloud-based object store of the second storage tier comprise respective compressed and deduplicated files of the hidden data store of the file system that also have corresponding stubs in the user visible name space.

10. The apparatus of claim 1 wherein write operations against files that have been controllably relocated from the hidden data store of the file system of the first storage tier to the cloud-based object store of the second storage tier are cached locally in the first storage tier and subsequently pushed to the cloud-based object store so as to enhance write performance.

11. The apparatus of claim 1 wherein the first storage tier comprises a distributed storage tier comprising a plurality of file system nodes each having a file system with a user visible name space and a corresponding hidden data store and wherein the file system nodes collectively provide a single name space.

12. The apparatus of claim 1 wherein the first storage tier comprises a distributed storage tier comprising a plurality of file system nodes each having a file system with a user visible name space and a corresponding hidden data store and wherein a given file relocated from multiple ones of the hidden data stores into the cloud-based object store of the second storage tier has only a single corresponding object instance in the cloud-based object store but multiple stubs in respective ones of the multiple hidden data stores from which the given file was relocated.

13. The apparatus of claim 1 wherein the storage system is further configured to store a transaction log of changes to the user visible name space and the hidden data store of the file system as at least one object in the cloud-based object store.

14. The apparatus of claim 1 wherein the object store of the second storage tier comprises a plurality of object storage nodes and wherein stored objects of the object store have respective unique object identifiers.

15. A method performed in a storage system with at least first and second storage tiers each comprising a plurality of storage devices, the storage system being implemented at least in part by at least one processing device comprising a hardware processor coupled to a memory, the first storage tier implementing a file system having a user visible name space and a corresponding hidden data store, the second storage tier implementing a cloud-based object store, the method comprising:
   controllably relocating files from the hidden data store of the file system of the first storage tier to the cloud-based object store of the second storage tier; and
   in conjunction with the relocation of a given one of the files, replacing the given file in the hidden data store with a corresponding stub providing user access via the user visible name space to an object comprising the given file in the cloud-based object store of the second storage tier;
   wherein the user visible name space comprises a plurality of additional stubs;
      a first subset of the plurality of additional stubs of the user visible name space pointing to respective files stored in the hidden data store; and
      a second subset of the plurality of additional stubs of the user visible name space pointing to the corresponding stub in the hidden data store that points to the object comprising the given file stored in the cloud-based object store of the second storage tier;
   wherein the first subset of the plurality of additional stubs of the user visible name space includes first and second additional stubs, the first and second additional stubs pointing to respective first and second variants of the given file associated with first and second writes by one or more clients to the given file subsequent to relocation of the given file to the cloud-based object store of the second storage tier, the first and second variants being cached locally in the hidden data store;
   wherein the first and second variants of the given file cached locally in the hidden data store each point to the corresponding stub in the hidden data store that points to the object comprising the given file stored in the cloud-based object stored of the second storage tier.

16. The method of claim 15 wherein the files that are controllably relocated from the hidden data store of the file system of the first storage tier to the cloud-based object store of the second storage tier comprise respective compressed and deduplicated files of the hidden data store of the file system that also have corresponding stubs in the user visible name space.

17. The method of claim 15 wherein write operations against files that have been controllably relocated from the hidden data store of the file system of the first storage tier to the cloud-based object store of the second storage tier are cached locally in the first storage tier and subsequently pushed to the cloud-based object store so as to enhance write performance.

18. A computer program product comprising a non-transitory processor-readable storage medium having stored therein program code of one or more software programs, wherein the program code when executed by at least one processing device of a storage system, the storage system comprising at least first and second storage tiers each comprising a plurality of storage devices, the first storage tier implementing a file system having a user visible name space and a corresponding hidden data store, and the second storage tier implementing a cloud-based object store, causes said storage system:
   to controllably relocate files from the hidden data store of the file system of the first storage tier to the cloud-based object store of the second storage tier; and
   in conjunction with the relocation of a given one of the files, to replace the given file in the hidden data store with a corresponding stub providing user access via the user visible name space to an object comprising the given file in the cloud-based object store of the second storage tier;
   wherein the user visible name space comprises a plurality of additional stubs;
      a first subset of the plurality of additional stubs of the user visible name space pointing to respective files stored in the hidden data store; and
      a second subset of the plurality of additional stubs of the user visible name space pointing to the corresponding stub in the hidden data store that points to the object comprising the given file stored in the cloud-based object store of the second storage tier;
   wherein the first subset of the plurality of additional stubs of the user visible name space includes first and second additional stubs, the first and second additional stubs pointing to respective first and second variants of the given file associated with first and second writes by one or more clients to the given file subsequent to relocation of the given file to the cloud-based object store of the second storage tier, the first and second variants being cached locally in the hidden data store;
   wherein the first and second variants of the given file cached locally in the hidden data store each point to the corresponding stub in the hidden data store that points to the object comprising the given file stored in the cloud-based object stored of the second storage tier; and wherein the first and second additional stubs and the corresponding stub are associated with the given file and the first and second variants of the given file.

19. The computer program product of claim 18 wherein the files that are controllably relocated from the hidden data store of the file system of the first storage tier to the cloud-based object store of the second storage tier comprise respective compressed and deduplicated files of the hidden data store of the file system that also have corresponding stubs in the user visible name space.

20. The computer program product of claim 18 wherein write operations against files that have been controllably relocated from the hidden data store of the file system of the first storage tier to the cloud-based object store of the second storage tier are cached locally in the first storage tier and subsequently pushed to the cloud-based object store so as to enhance write performance.

21. The apparatus of claim 1 wherein the storage system is further configured:

to monitor the first and second writes from the one or more clients to determine whether a total number of newly-written blocks in the first and second variants of the given file exceeds a designated threshold of newly-written blocks; and to relocate at least one of the first and second variants of the given file from the hidden data store to the cloud-based object store responsive to determining that the total number of newly-written blocks of the given file exceeds the designated threshold of newly-written blocks.

* * * * *